Nov. 3, 1964 T. HAFNER 3,155,050
AIR-CUSHION SUPPORTED VEHICLES
Filed Dec. 11, 1962 3 Sheets-Sheet 1

INVENTOR
THEODORE HAFNER

Nov. 3, 1964 T. HAFNER 3,155,050
AIR-CUSHION SUPPORTED VEHICLES
Filed Dec. 11, 1962 3 Sheets-Sheet 2
FIG. 5
SUPERSONIC
DIST. BY ECHO MEAS.
CRYSTAL
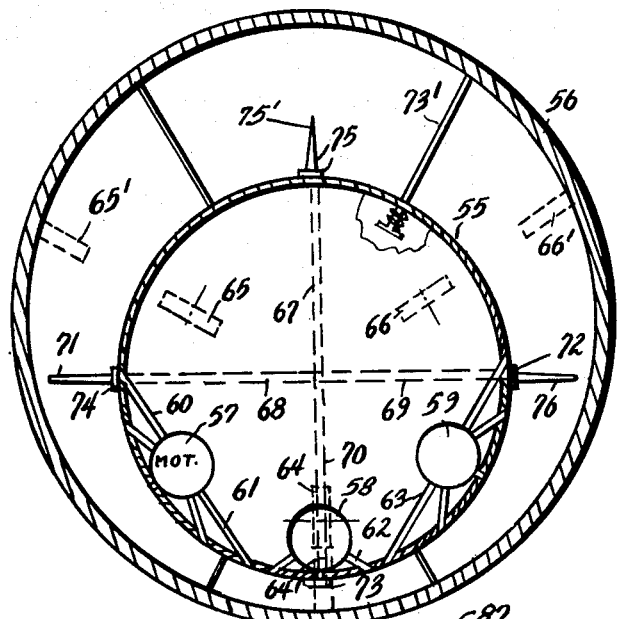
FIG. 6
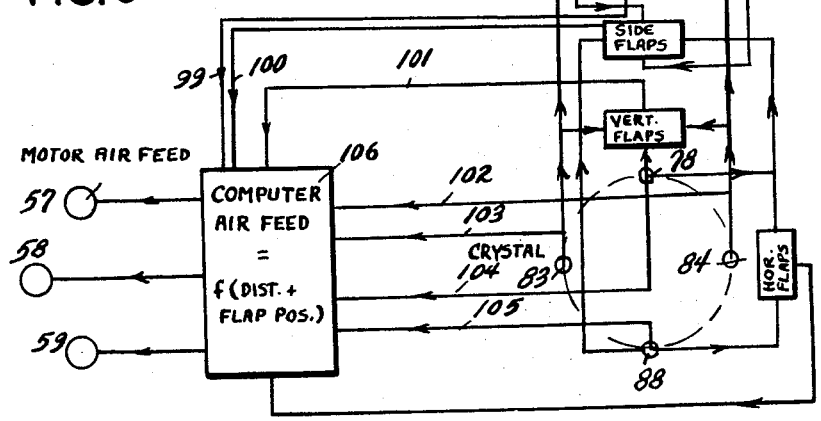
FIG. 7
INVENTOR
THEODORE HAFNER

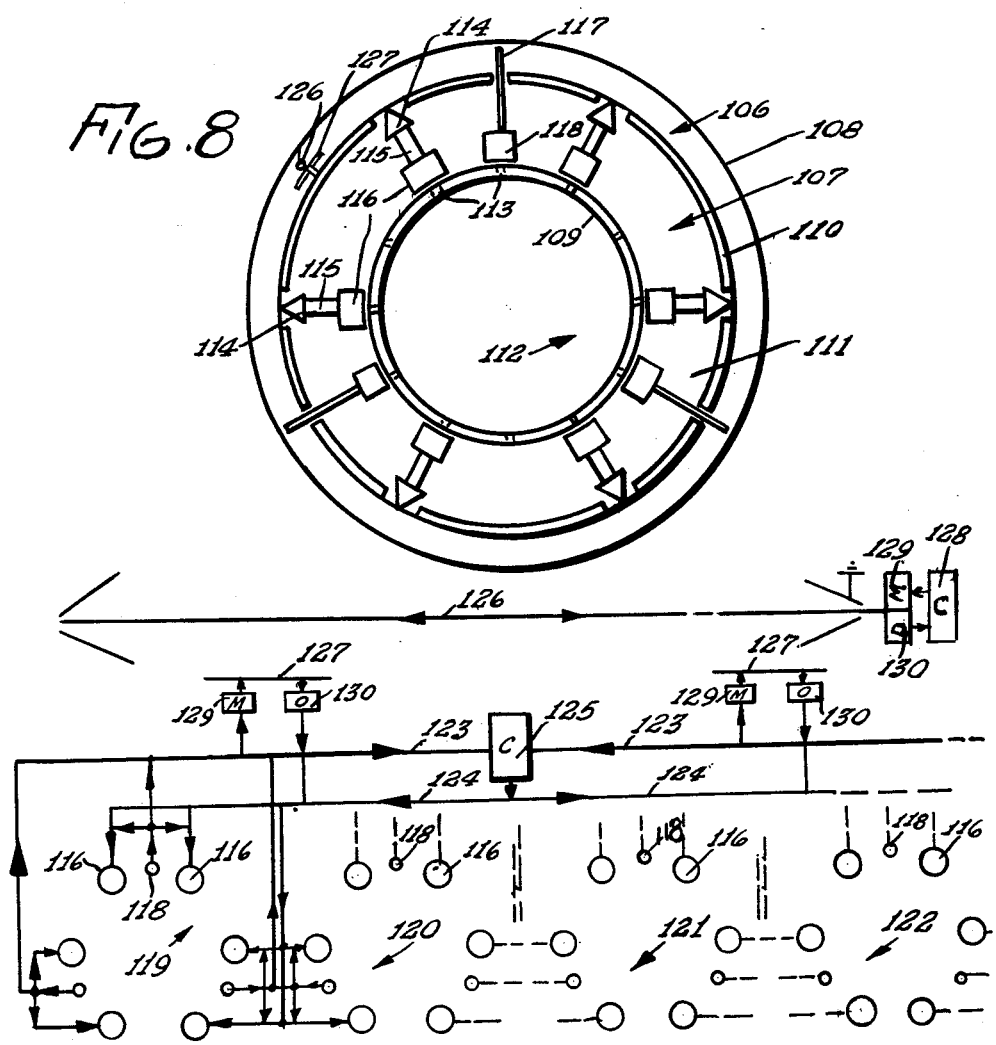

3,155,050
AIR-CUSHION SUPPORTED VEHICLES
Theodore Hafner, 1501 Broadway, New York 36, N.Y.
Filed Dec. 11, 1962, Ser. No. 244,858
3 Claims. (Cl. 104—138)

This invention relates to vehicles traveling on an air cushion and is a continuation-in-part of Serial No. 13,337, filed on March 7, 1960, and issued as Patent 3,108,546 on October 29, 1963.

One of the objects of this invention is to provide a tubular passage for the vehicle so as to produce predetermined air current and pressure conditions, not only below but also all around the vehicle to obtain propulsion at maximum efficiency.

Another object of the invention is to produce predetermined pressure conditions on at least two diametrical points of the vehicle.

Still another object of the invention is to provide around the vehicle a predetermined peripheral air gap of predetermined and preferably substantially continuous pressure distribution so as to cause centering of the vehicle in a predetermined position within a minimum tubular space.

A further object of the invention is to provide on the vehicle, guiding flaps for horizontal and vertical control with respect to the tubular space as well as for horizontal and vertical control of one part of the vehicle with respect to the other.

Still a further object of the invention is to cause air movement by a propeller and a further object of the invention is to cause air movement by a reaction motor; in both cases, additional means being provided to guide and control the air or gas flow towards the peripheral air gap.

It has been known to transport vehicles over an air cushion formed between the bottom of the vehicle and ground surface. One of the disadvantages of this type of transportation is, while it permits the achievement of rather high speeds, it requires a great deal of power for rather limited pay loads.

This inefficiency in operation has been found to be based to a large extent on the losses incurred in providing the air cushion and caused by lateral escape of air from the air cushion, which tends to reduce the air cushion pressure.

Another disadvantage has been found in the relatively uncontrolled air flow occurring not only on the sides but also on the top as well as at the front and rear ends of the vehicle, all contributing to losses reducing efficiency of transportation.

These disadvantages are reduced if not avoided, in accordance with the invention, by enclosing the vehicle in a predetermined space and forming a peripheral air gap around it which permits a predetermined and relatively accurate control of the air flow and pressure, thereby reducing losses to a minimum and exploiting to its maximum the air cushion for carrying the vehicle with gap measuring means supported on said vehicle in a number of positions arranged substantially symmetrical with respect to the axis of said vehicle and a number of guiding flaps also supported on said vehicle in positions substantially symmetrical with respect to the axis of said vehicle under control of said gap measuring means to maintain said vehicle in a substantially predetermined position with respect to said conduit.

Another advantage of the invention is that it permits shaping of the air vehicle to its best form cooperating with the shape of the surrounding enclosure and, at the same time, it provides propulsion and guiding means adapted to this combined structure and capable of exact design and operation, thereby assuring the movement of the vehicle in predetermined relative positions with respect to the enclosure.

A further advantage of this combination is the possibility of using existing experiences and structures derived from the construction and guidance of other vehicles, such as the airplane or guided missile.

More specifically, in accordance with the invention, in some cases it becomes possible to use existing structures for propelling, guiding and embodying the vehicle.

These and other objects of the invention will be more fully apparent from the drawings annexed to it, in which FIGS. 1 and 2 in cross and side elevations, respectively, represent a transportation system embodying certain principles of the invention.

FIG. 5 shows in cross section another transportation system, in accordance with the invention, including reaction motors and a specific type of launching means as well as means for controlling the position of the vehicle within its guiding conduit.

FIG. 6 represents a side view of the vehicle according to the invention showing various guiding mechanisms.

FIG. 7 indicates in circuit diagram means for controlling the position of the vehicle automatically and by means such as shown in FIGS. 5 and 6.

FIG. 8 shows a further embodiment of the invention including an automatic position control, and FIG. 9 shows a corresponding circuit diagram describing the manner in which the vehicle is controlled in its position at several cross sections of its longitudinal extension.

Figures 1, 2:
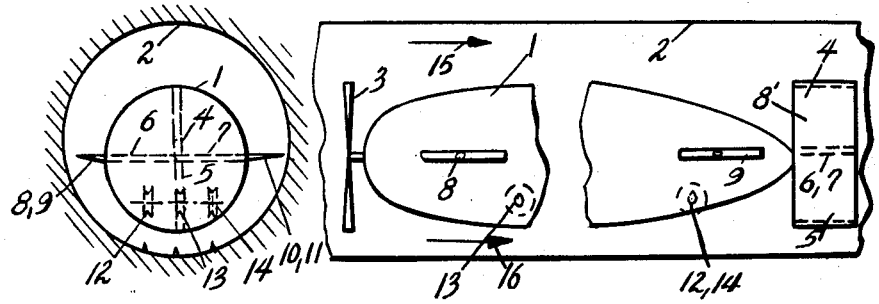

In FIG. 1 a transportation system according to the invention is shown to include an inner tube forming a vehicle 1 consisting preferably of lightweight material such as aluminum and an outer tube forming a conduit 2 consisting of concrete or of steel imbedded in concrete or wholly or partially concrete. Vehicle 1 may be streamlined in a manner similar to that of an airplane body and provided at its front end with a propeller 3 and at its rear end with two pairs of perpendicular guiding flaps schematically indicated in FIG. 1 at 4, 5, 6 and 7 which, as apparent from FIG. 2, are enclosed by a protection cylinder schematically indicated at 8'. Flaps 4, 5, 6 and 7 are independently moveable so as to give maximum control to assure the position of vehicle 1 within conduit 2.

In addition there may be provided additional side flaps 8, 9, and 10, 11, respectively, which also serve to assure control of the position of vehicle 1 within conduit 2 with the utmost accuracy. Furthermore, in a manner similar to that provided in aircraft, landing gear is provided as schematically indicated in FIG. 1 at 12, 13 and 14, one front wheel 13 and two rear wheels 12, 14 all arranged retractable similar in manner to that provided on aircraft, except that in view of the size of the air cushion (which may be of the order of an inch) the retraction movement is relatively short but nevertheless should be as gradual and as accurate as possible. Furthermore, to facilitate stability, wheels 12, 13 and 14 may be grooved and adapted to engage similarly shaped guide rails 12', 13' and 14' provided on conduit 2.

If necessary, the rails may be so shaped as to permit the vehicle to be used on ordinary railroad rails. In this case, of course, the retraction machinery for wheels 12, 13, 14 may be adjusted in two operative positions, one in which it is fixed at a relatively small distance from the surface of vehicle 1 determined by the arrangement for launching and landing within conduit 2, and another operative position in which it is fixed at a relatively large distance from the surface of vehicle 1 determined by the manner in which vehicle 1 is designed to ride with wheels 12 and 14 only on standard railroad rails, with wheel 13 being replaced by another pair of wheels 12, 14.

In conduit 2 the device operates in the following manner:

As soon as propeller 3 starts turning, the air transported by propeller 4 will be pushed in the direction of arrows, 15, 16 in the peripheral space between vehicle 1 and conduit 2. As a result, the air will be compressed in this space and, at a certain speed, vehicle 1 will gradually rise, carried on the air cushion provided in space indicated by arrow 16, but will be prevented from further rising by the pressure provided in space 15. After gradual retraction of wheels 12, 13, 14, the position of vehicle 1 in conduit 2 will be stabilized at a predetermined speed and, with a minimum of loss and with exactly defined conditions of air current and pressure, vehicle 1 will move in tubular space defined by conduit 2.

Figures 3, 4:
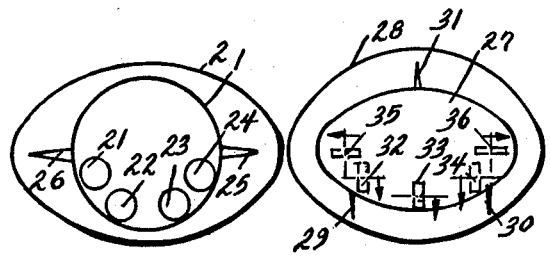
FIGS. 3 and 4 represent modifications of such a transportation system shown in cross elevations, corresponding to FIG. 1.

As is apparent from FIG. 3, propeller propulsion may be replaced by reaction propulsion by reaction motors 21, 22, 23 and 24. In this example of the invention, the vehicular tube 1 is of circular shape with side flaps being arranged at 25, 26.

The vehicle shown in FIG. 3 may also be provided with retractable landing gear similar to that shown in FIGS. 1 and 2.

As is apparent from FIG. 4, vehicle 27 is shown to be of substantially elliptical cross section and it is caused to be moved on an air cushion formed in elliptical tubular conduit 28, which may or may not be concentrical with vehicle 27. Vehicle 27 is provided with bottom flaps or guides 29, 30 which may be fixed or adjustable to increase stability, or aid in controlling the position of vehicle 27 in conduit 28 as the case may be. There are also top flaps or guides 31 which may also be fixed or adjustable to control air flow and position of vehicle 27 without departing from the scope of this disclosure.

Side flaps are not shown in FIG. 4 but may also be provided.

Furthermore, in accordance with a further feature of the invention which may be applied to all its embodiments, in addition to a retractable bottom landing gear, such as shown at 32, 33, 34, of the tricycle type, there also is provided a lateral guiding wheel, schematically indicated at 35, 36, which may be arranged to move substantially simultaneously with the bottom landing gear to enhance launching and landing stability.

FIG. 5 illustrates a vehicle 55 arranged to move within a conduit 56 and provided with three reaction motors 57, 58, 59 or longitudinal arrays of reaction motors. Air and reaction gases are shown to be fed through pipes schematically indicated at 60, 61, 62, 63, to various parts of the peripheral gap, especially to the gap at the bottom of vehicle 55 forming the air cushion which, as stated above, may be relatively thin, of the order of one inch or less.

In order to facilitate launching and landing, a three-point landing gear is arranged as schematically indicated by wheel at 64, 65, and 66. Depending upon the length of vehicle 55, there may be a number of such landing gears arranged in cascade along the axis of vehicle 55, properly synchronized to operate substantially simultaneously or in a predetermined phase relationship depending upon the mode of launching and landing, i.e. the angle of ascent or descent of vehicle 55. Since such landing gears and their control are well known from airplane structures and operations, there is no need to describe such gear or gears in further detail. Each of the wheels 64, 65, 66 may consist of two or even more wheels cascaded in a direction parallel to the axis of the vehicle and operating simultaneously or in predetermined phased relationships.

The landing positions of these wheels are shown at 64', 65', 66', respectively.

Vehicle 55 is also provided with a number of horizontal and vertical stabilizing flaps, such as main flaps, preferably arranged at the rear end of the vehicle as schematically shown in FIG. 5, schematically at 67, 68, 69 and 70, respectively, preferably all adjustable substantially independently from each other.

In addition, to further enhance the stabilizing of the position of vehicle 55 within conduit 56, auxiliary flaps such as side flaps 71 and 72 are provided singly or in a cascade array arranged in a direction parallel to the axis of vehicle 55. The top of vehicle 55 may have top flaps schematically indicated at 75' and arranged either singly or cascaded as a horizontal array of flaps.

Furthermore, in accordance with the invention, the various flaps are controlled by distance measuring devices provided at predetermined points of the peripheral gap and indicating the radial distance between vehicle and conduit or comparing this distance with a predetermined desired distance.

Such indicating devices are well known per se. See for example in the form of electromechanical transducers, such as disclosed in U.S. Patent 2,896,139. They may consist of mechanical sensing or feeling rods moving against spring pressure and schematically indicated at 73'. Alternatively and concomitantly, supersonic or electrowave echometers, also of well known construction, may be used to indicate or compare distances.

In a preferred embodiment of the invention, illustrated in FIG. 5, the distance measuring devices are shown to consist of supersonic crystal oscillator and receiving devices shown at 74, 75, 76 and 77, respectively, which transmit at predetermined points a predetermined supersonic signal from the surface of vehicle 55 and receives its reflection from the surface of tubular conduit 56, thereby permitting a measure of the distance, at those points between vehicle and conduit 56.

These crystal devices may be arranged, as apparent from FIG. 6, in several arrays schematically indicated at 78, 79, 80, 81, 82, 83, 84, 85, 86, 87, 88, 89, respectively, distributed along the outer surface of vehicle 55 in the manner schematically indicated in FIG. 6 or in any other appropriate manner.

FIG. 6 also shows a number of auxiliary side, top and bottom flaps at 91, 92, 93, 94 and 95, 96, 97, 98, respectively. In addition, but not shown, in FIG. 6, there are arranged at the end of the vehicle 55, main stabilizing flaps of the type shown in FIG. 5 at 67 to 70.

As is apparent from FIG. 7, auxiliary and main flaps 91 to 98, and 67 to 70 of vehicle 55 are controlled by crystal devices 74 to 77 in the following manner:

A comparison between crystal devices 79 and 83, and 80 and 84, respectively, may control the position of top and bottom flaps 91, 94 and 95, 98, respectively, while a comparison between top crystal devices 78 and 82, and 81 and 85 will control the position of side flaps 92, 93 and 96, 97, respectively. At the same time, a comparison between crystal devices 82 and 85 may control the position of main horizontal flaps 68, 69 as shown in FIG. 5, and similarly a comparison between crystal devices 83, 84 may control the main vertical flaps 67, 70, respectively.

The invention, of course, is not limited to this particular type and number of control means.

In addition, information derived from the various flap positions, such as shown by connections 99, 100, 101, 102, 103, 104 and 105, may be fed into a computer schematically indicated at 106 and may be used to control the air feed of motors 57, 58, 59 to the peripheral gap, especially the air cushion, between vehicle 55 and conduit 56 in such a manner as to obtain any desired air current and pressure distribution and to further stabilize the position of vehicle 55 within conduit 56.

FIG. 8 shows an embodiment of the invention including an example of pressure control in the circular air gap 106 formed between vehicle 107 and conduit or tunnel 108. Vehicle 107 is double walled having an inner wall 109, representing for example the intake tube of a jet engine or reaction motor, and an outer wall 110. The space 111 between inner wall 109 and outer wall 110 is connected to intake space 112 by means of openings 113 permitting part of the intake air to be deviated into space 111. Openings 113 may be provided with valves (not shown) which may be controlled manually or automatically depending upon the amount of air and air pressure to be required in space 111 which serves as a reservoir to control the air quantity and/or air pressure to be provided in the circular air gap 106.

The air flow conditions in air gap 106 are controlled by a number of valves, for example 6 valves, schematically indicated in FIG. 8 at 114 which are electromagnetically activated by magnetic plungers, schematically indicated at 115, under control of magnetic coils 116 surrounding plungers 114, thereby forming a transducer determining the position of valves 114 under control of signals derived from similar transducers 117–118 which, in contrast to transducers 114–115–116, translate mechanical movements into electrical signals. Transducers 117–118 include a probe rod 117 extending from vehicular wall 110 against tunnel wall 108 and provided at its end with friction reducing devices such as rollers (not shown) and the length of which is controlled, for example, against the force of a spring (not shown), by the distance between walls 108 and 110, i.e. by the thickness of the circular air gap 106, at the point of probe 117.

Depending upon that thickness, probe rod 117 will be pushed more or less into associated magnetic coil 118, thereby producing a current or voltage signal proportional or determining a measure for the size of air gap 106 at that particular point. This signal in turn may be used in accordance with the invention to control the position of valve or valves 114 adjacent probe 117 and thereby permit, under the control of an air gap thickness greater or smaller than a predetermined standard thickness, to re-establish that standard by adding or subtracting air at that particular region by way of more opening or more closing of adjacent valves 114. If desired, the corrective effect may be increased by operating under control of probes 117, in an opposite sense, valves 114 which are diametrically located with respect to probes 117.

In addition, to this automatic type of control of the air flow or air conditions surrounding wall 110, a manual type of control can be provided in accordance with the invention as indicated in FIG. 9 which represents a circuit diagram for a control arrangement such as shown in FIG. 8, but also as applied to a number of cross sections of the vehicle at which the position of the vehicle with respect to the surrounding conduit is controlled in accordance with the invention.

FIG. 9 shows at 119 a control cross section such as illustrated in FIG. 7, and a number of similar control cross sections schematically indicated at 120, 121, 122 to control the air gap at several cross sections of vehicular tube 107 at predetermined intervals and points longitudinally spaced from each other; each of these cross-sectional planes present an arrangement such as shown in FIG. 7. In each of these cross-sectional planes valves 114 and associated coils 116 are controlled by probes 117 and associated coils 118 in a manner similar to that shown in and described with respect to FIG. 8. However, in addition to the automatic controls of valves 114, there is also provided a direct observation and manual control as indicated by lines 123 and 124 which carry the observation signals derived from the individual probes to a central observation station on the train schematically indicated at 125, and similarly, operation signals are carried in reverse direction from central station 125 to valves 114. Central station 125 may be arranged on the vehicle itself, and/or for more remote and unmanned control, it may be arranged stationary, and the corresponding signals derived from and to the vehicle can be transmitted without physical contact to a surface wave transmission line in accordance for example with my U.S. patent specification No. 2,921,979, schematically indicated in FIGS. 7 and 8 at 126 suspended in tunnel gap 106 in such a manner as to permit a properly designed field probe or antenna, or several probes or antennas, to pick up and transmit, respectively, the signals derived from or fed into coils 116, 118 to and from a remote control station connected to surface wave transmission line 126 and schematically indicated in FIG. 9 at 128.

In this case, in accordance with surface wave teaching, it may be necessary to modulate and demodulate, respectively, the signals feeding from and into coils 118, 116, respectively, before applying them to probe 117, and correspondingly to modulate or demodulate, respectively, the signals feeding from or into a remote center 128. Corresponding modulators and demodulators of VHF or UHF range are shown at 129, 130, respectively, producing the VHF or UHF carrier frequencies of the operating range of the surface wave transmission line 126 concerned.

Thus, at control stations 125 and/or 128, whether on the train or remote, whether moving or stationary, a controller may observe the signals derived from probes 117 and send other signals in the opposite direction activating desired valves 114 to maintain train tube 110 in a predetermined or desired position with respect to conduit 108.

While the invention has been illustrated with certain propulsion means, certain vehicular means, and certain tubular means, as well as certain stabilizing means and also with certain means for controlling these stabilizing means, the invention is in no way limited to the particular shapes and structures shown, but may be applied in any form or manner whatsoever without departing from the scope of this disclosure.

I claim:

1. In a vehicular transportation system, an outer tubular means forming a conduit, an inner tubular means forming a vehicle of tubular cross-section and mounted in said conduit spaced therefrom by a pre-determined peripheral gap separating said vehicle substantially over its entire circumference from said conduit, means on said vehicle for feeding air from at least one of its ends at least to the bottom of said peripheral gap, gap measuring means supported on said vehicle in a number of positions arranged substantially symmetrical with respect to the axis of said vehicle and a number of guiding flaps also supported on said vehicle in positions substantially symmetrical with respect to the axis of said vehicle under control of said gap measuring means to maintain said vehicle in a substantially predetermined position with respect to said conduit.

2. In a vehicular transportation system, an outer tubular means forming a conduit, an inner tubular means forming a vehicle of tubular cross-section and mounted in said conduit spaced therefrom by a predetermined peripheral gap separating said vehicle substantially over its entire circumference from said conduit, means on said vehicle for feeding air from at least one of its ends at least to the bottom of said peripheral gap, air pressure measuring means supported on said vehicle in a number of positions arranged substantially symmetrical with respect to the axis of said vehicle and a number of guiding flaps also supported on said vehicle in positions substantially symmetrical with respect to the axis of said vehicle under control of said air pressure measuring means to maintain said vehicle in a substantially predetermined position with respect to said conduit.

3. System according to claim 2 comprising air feeding means under control of said air pressure measuring means to maintain said vehicle in a predetermined position with respect to said conduit.

References Cited by the Examiner

UNITED STATES PATENTS

| | | | |
|---|---|---|---|
| 1,355,911 | 10/20 | Riddick | 104—23 |
| 1,727,720 | 9/29 | Kruckenberg. | |
| 2,511,979 | 6/50 | Goddard | 104—138 |
| 3,006,288 | 10/61 | Brown | 104—138 |
| 3,087,439 | 4/63 | Petrocokino | 104—138 |
| 3,108,546 | 10/63 | Hafner | 104—138 |

LEO QUACKENBUSH, *Primary Examiner.*